(12) United States Patent
Ko et al.

(10) Patent No.: US 9,045,706 B2
(45) Date of Patent: Jun. 2, 2015

(54) METHOD OF OPERATION OF PROCESS TO PRODUCE SYNGAS FROM CARBONACEOUS MATERIAL

(71) Applicant: INEOS BIO SA, Rolle (CH)

(72) Inventors: Ching-Whan Ko, Fayetteville, AR (US);
Michael Sean Slape, Naperville, IL (US); Peter Simpson Bell, Dunblane (GB); Kim Ocfemia, Fayetteville, AR (US)

(73) Assignee: INEOS BIO SA, Rolle (CH)

( * ) Notice: Subject to any disclaimer, the term of this patent is extended or adjusted under 35 U.S.C. 154(b) by 0 days.

(21) Appl. No.: 14/276,492

(22) Filed: May 13, 2014

(65) Prior Publication Data

US 2014/0246626 A1      Sep. 4, 2014

Related U.S. Application Data

(63) Continuation of application No. 13/427,247, filed on Mar. 22, 2012, now abandoned.

(60) Provisional application No. 61/516,646, filed on Apr. 6, 2011, provisional application No. 61/516,704, filed on Apr. 6, 2011, provisional application No. 61/516,667, filed on Apr. 6, 2011.

(51) Int. Cl.
*C01B 3/32* (2006.01)
*C10J 3/72* (2006.01)
(Continued)

(52) U.S. Cl.
CPC .......... *C10J 3/72* (2013.01); *C01B 2203/0877* (2013.01); *C01B 2203/0894* (2013.01); *C10J 3/84* (2013.01); *C10J 3/86* (2013.01);
(Continued)

(58) Field of Classification Search
USPC ......................................................... 252/373
See application file for complete search history.

(56) References Cited

U.S. PATENT DOCUMENTS 3,980,592 A   9/1976  Marion
4,017,271 A   4/1977  Barclay
(Continued)

FOREIGN PATENT DOCUMENTS

DE   4035293   1/1992
EP   0416242   3/1991
(Continued)

OTHER PUBLICATIONS

International Searching Authority, International Search Report—PCT/US2012/032160, dated Aug. 30, 2012 (4 pgs.).
(Continued)

*Primary Examiner* — Wayne Langel
(74) *Attorney, Agent, or Firm* — Ineos USA LLC

(57) ABSTRACT

A process is provided for producing syngas that is effective for use in downstream processes. The process for producing syngas includes operating a gasification apparatus in a start-up mode until the gasification apparatus and equipment downstream of the gasification apparatus are adequately warmed up to a first target temperature. Upon reaching a first target temperature, the process is then operated in a production mode to produce a second syngas with a higher $CO/CO_2$ molar ratio. Operation in a start-up mode until reaching a first target temperature, provides a process that is effective for reducing fouling in downstream equipment and for providing a second syngas can be more effectively cooled and cleaned.

41 Claims, 4 Drawing Sheets

(51) Int. Cl.

| | | |
|---|---|---|
| *C10J 3/84* | (2006.01) | |
| *C10J 3/86* | (2006.01) | |
| *C10K 3/00* | (2006.01) | |
| *C10K 1/04* | (2006.01) | |
| *F22B 1/18* | (2006.01) | |
| *C10K 1/02* | (2006.01) | |

(52) U.S. Cl.
CPC ......... *C10J2300/1884* (2013.01); *C10K 3/005* (2013.01); *C10K 3/008* (2013.01); *C10J 3/723* (2013.01); *C10J 3/726* (2013.01); *C10J 2300/0956* (2013.01); *C10J 2300/0959* (2013.01); *Y02E 50/17* (2013.01); *Y02E 50/32* (2013.01); *Y02E 50/343* (2013.01); *C10K 1/04* (2013.01); *C10J 3/721* (2013.01); *C10J 2300/1606* (2013.01); *C10J 2300/1846* (2013.01); *F22B 1/1838* (2013.01); *Y02T 10/16* (2013.01); *C10K 1/02* (2013.01); *C10K 3/003* (2013.01)

(56) References Cited

U.S. PATENT DOCUMENTS

| | | | |
|---|---|---|---|
| 4,497,637 A * | 2/1985 | Purdy et al. | ............ 48/111 |
| 4,805,561 A | 2/1989 | Davis | |
| 5,145,491 A | 9/1992 | Schmitt | |
| 6,033,447 A | 3/2000 | Moock | |
| 6,435,139 B1 | 8/2002 | Brucher | |
| 7,285,402 B2 | 10/2007 | Gaddy | |
| 7,552,701 B2 | 6/2009 | Brinkmann | |
| 7,587,995 B2 | 9/2009 | Kraft | |
| 7,923,476 B2 | 4/2011 | Young | |
| 7,932,298 B2 | 4/2011 | Young | |
| 8,153,027 B2 * | 4/2012 | Klepper et al. | ............ 252/373 |
| 8,894,885 B2 | 11/2014 | Bell | |
| 2007/0266634 A1 | 11/2007 | Tsangarais | |
| 2008/0115415 A1 | 5/2008 | Agrawal | |
| 2008/0169449 A1 | 7/2008 | Mundschau | |
| 2008/0209807 A1 | 9/2008 | Tsangaris | |
| 2008/0210089 A1 | 9/2008 | Tsangarais | |
| 2008/0244976 A1 | 10/2008 | Paisley | |
| 2008/0280236 A1 | 11/2008 | Wright | |
| 2009/0014689 A1 * | 1/2009 | Klepper et al. | ............ 252/373 |
| 2009/0018221 A1 | 1/2009 | Klepper | |
| 2009/0018222 A1 | 1/2009 | Klepper | |
| 2009/0064581 A1 | 3/2009 | Nielsen | |
| 2009/0090053 A1 | 4/2009 | Feldmann | |
| 2009/0156695 A1 | 6/2009 | Young | |
| 2009/0260286 A1 | 10/2009 | Sasauchi | |
| 2010/0044643 A1 | 2/2010 | Wallace | |
| 2010/0090166 A1 | 4/2010 | Fournier | |
| 2010/0180503 A1 | 7/2010 | Yokohama | |
| 2010/0224835 A1 | 9/2010 | Chornet | |
| 2010/0256246 A1 | 10/2010 | Carryer | |
| 2010/0317077 A1 | 12/2010 | Gaddy | |
| 2011/0248218 A1 | 10/2011 | Sutradhar | |
| 2011/0250661 A1 | 10/2011 | Sutradhar | |
| 2011/0250662 A1 | 10/2011 | Sutradhar | |
| 2012/0255301 A1 | 10/2012 | Bell | |
| 2012/0256128 A1 | 10/2012 | Bell | |
| 2012/0256129 A1 | 10/2012 | Bell | |

FOREIGN PATENT DOCUMENTS

| | | |
|---|---|---|
| WO | 9318341 | 9/1993 |
| WO | 2007048058 | 4/2007 |
| WO | 2007112101 | 10/2007 |
| WO | 2007117157 | 10/2007 |
| WO | 2007131241 | 11/2007 |
| WO | 2008098311 | 8/2008 |
| WO | 2009023364 | 2/2009 |
| WO | 2009076138 | 6/2009 |
| WO | 2009106357 | 9/2009 |
| WO | 2009112334 | 9/2009 |
| WO | 2009154788 | 12/2009 |
| WO | 2009155697 | 12/2009 |

OTHER PUBLICATIONS

International Searching Authority, International Search Report—PCT/US2012/032174, dated Aug. 20, 2012 (3 pgs.).
International Searching Authority, International Search Report—PCT/US2010032168, dated Oct. 29, 2012, (6 pgs.).

* cited by examiner

US 9,045,706 B2

METHOD OF OPERATION OF PROCESS TO PRODUCE SYNGAS FROM CARBONACEOUS MATERIAL

This application claims the benefit of U.S. Provisional Application Nos. 61/516,646, 61/516,704 and 61/516,667 all filed Apr. 6, 2011, all of which are incorporated in their entirety herein by reference.

A process is provided for gasification of carbonaceous materials to produce producer gas or synthesis gas or syngas comprising carbon monoxide and hydrogen. More specifically, the process is effective for producing cooled syngas for downstream use. The process utilizes gasification of carbonaceous materials to produce a syngas followed by cooling of said syngas to produce cooled syngas and optionally cleaning said cooled syngas to produce a clean syngas for several downstream processes.

BACKGROUND

Gasification of carbonaceous materials to produce producer gas or synthesis gas or syngas comprising carbon monoxide and hydrogen is well known in the art. Typically, such a gasification process involves a partial oxidation or starved-air oxidation of carbonaceous material in which a sub-stoichiometric amount of oxygen is supplied to the gasification process to promote production of carbon monoxide as disclosed in PCT Patent Application No. WO 93/018341. Gaseous products produced by partial oxidation of carbonaceous materials are often treated in a high temperature heat treatment unit, e.g. for destruction of tar. See for example WO 2009/154788 that discloses a two stage gasifier in which carbonaceous material is fed to the first stage in which air, oxygen-enriched air or pure oxygen can be injected at controlled rate. The first stage temperature and oxygen input is controlled such that only partial oxidation of carbonaceous material occurs. The gaseous product from the first stage moves to the second stage (heat treatment unit). Pure oxygen is introduced into the second stage in order to accomplish cracking and partial oxidation of any tar contained in the gaseous stream from the first stage. Product syngas is removed from the second stage.

Syngas produced by gasification processes described in the art can be hot and needs cooling prior to downstream processing. Recovery and use of this heat content of hot syngas can be very important for process economics. Hot syngas comprising carbon monoxide generated in gasification apparatus, is cooled in a heat exchanger or waste heat boiler downstream of the gasification apparatus. See for example U.S. Pat. Nos. 6,435,139; 7,587,995 and 7,552,701.

At high temperature reducing environment carbon monoxide is a stable product. However when carbon monoxide is cooled, carbon monoxide may oxidize into carbon dioxide, and produce carbon (graphite) that precipitates as soot:

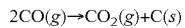

$$2CO(g) \rightarrow CO_2(g) + C(s)$$

This reaction is generally known as Boudouard reaction and is believed to take place at or below about 760° C. Fouling of heat transfer surface caused by deposit of carbon can cause disruption in operation of a syngas cooler. It is, therefore, important to eliminate or reduce fouling of the syngas cooler.

Sulfur in carbonaceous matter transforms to $H_2S$ in reductive mode of operation, to $SO_2$ in oxidative mode of operation. It is advantageous to make $SO_2$ during start-up so that it can be scrubbed easily prior to disposal.

There is a need for method of operation of a process comprising gasifying carbonaceous material in a gasification apparatus to produce syngas comprising carbon monoxide (CO) and carbon dioxide ($CO_2$) and cooling said syngas in a syngas cooler in a way that fouling or carbon deposit formation is reduced or eliminated.

SUMMARY

A process is provided for producing syngas that is effective for use in downstream processes. The process for producing syngas includes operating a gasification apparatus in a start-up mode until the gasification apparatus and equipment downstream of the gasification apparatus are adequately warmed up to a first target temperature. Upon reaching a first target temperature, the process is then operated in a production mode to produce a second syngas with a higher $CO/CO_2$ molar ratio. Operation in a start-up mode until reaching a first target temperature provides a process that is effective for reducing fouling in downstream equipment and for providing a second syngas can be more effectively cooled and cleaned. The second syngas with a higher $CO/CO_2$ molar ratio that is cooled and cleaned is especially useful for fermentation processes.

The process for producing syngas includes gasifying carbonaceous material to provide a first syngas having a CO to $CO_2$ molar ratio of less than about 0.5 until the first syngas reaches a first target temperature. Upon reaching the first target temperature, carbonaceous material is gasified to provide a second syngas having a CO to $CO_2$ molar ratio of greater than the first syngas. Gasifying of carbonaceous material occurs in a gasification apparatus and molecular oxygen is introduced at a rate of about 0 to about 100 lb-mole per ton of carbonaceous material on a dry basis to provide the first syngas. The temperature of the first syngas may be measured at one or more points inside and/or downstream of the gasification apparatus. When the temperature of the first syngas at one or more points inside and/or outside the gasification apparatus reaches the first target temperature, molecular oxygen is introduced at a rate of a rate of 0 to about 100 lb-mole per ton of carbonaceous material on a dry basis to provide the second syngas. In this aspect, the first target temperature is about 700° C. to about 1000° C.

In one aspect, at least a portion of the first syngas is passed through a syngas cooler to produce a cooled first syngas and at least a portion of the second syngas is passed through a syngas cooler to produce a cooled second syngas. In this aspect, syngas is passed through the syngas cooler at a linear velocity of greater than about 24 meters per second. At least a portion of the first syngas is provided to a thermal oxidation unit until the first syngas reaches the first target temperature.

In another aspect, a process is provided to produce syngas that includes adding carbonaceous material and molecular oxygen to a gasification apparatus to produce a first syngas with $CO/CO_2$ molar ratio less than 0.5. The temperature of the first syngas is measured downstream of the gasification apparatus. Temperature may be measured prior to entry into a syngas cooler or downstream of a syngas cooler. Once the syngas reaches a first temperature prior to entry into a syngas cooler, addition of molecular oxygen is reduced per unit mass of carbonaceous material in the gasification apparatus to produce a second syngas with $CO/CO_2$ molar ratio greater than that of said first syngas. The first target temperature is about 700° C. to about 1000° C. Reduction of addition of molecular oxygen per unit mass of carbonaceous material may be accomplished by increasing rate of addition of carbonaceous material. Alternatively, reduction of addition of molecular oxygen per unit mass of carbonaceous material may be accomplished by decreasing rate of addition of molecular oxygen.

At least a portion of the first syngas may be passed through the syngas cooler to produce a cooled first syngas and at least a portion of the second syngas may be passed through a syngas cooler to produce a cooled second syngas. At least a portion of the cooled first syngas may be mixed with a portion of the first syngas prior to its passing through said syngas cooler to produce the cooled first syngas. At least a portion of the cooled second syngas may be mixed with at least a portion of the second syngas prior to passing through the syngas cooler to produce the cooled second syngas. The mixture of the cooled first syngas and the first syngas flowing through the syngas cooler may have a linear velocity of greater than about 24 meter/second. The mixture of the cooled second syngas and the second syngas flowing through the syngas cooler may have a linear velocity of greater than about 24 meter/second.

In another aspect, one or more of steam and $CO_2$ may be added to the gasification apparatus prior to reduction of the addition of molecular oxygen per unit mass of carbonaceous material or prior to reaching a first target temperature. When additions are made prior to reaching a first target temperature, less than about 50 lb-mole steam per ton of carbonaceous material on a dry basis or less than about 50 lb-mole $CO_2$ per ton of carbonaceous material on a dry basis is added.

In another aspect, a process is provided that includes gasifying carbonaceous material in a gasification apparatus to produce a clean syngas. The method includes adding carbonaceous material and adding molecular oxygen in the gasification apparatus to produce a first syngas with $CO/CO_2$ molar ratio less than 0.5. At least a portion of the first syngas is passed through the syngas cooler to produce a cooled first syngas. At least a portion of the first cooled syngas is passed through a dust collection system to produce a clean syngas. The temperature of the clean syngas is measured at an exit of the dust collection system. Upon the temperature of clean syngas attaining a second target temperature, reducing addition of molecular oxygen per unit mass of carbonaceous material in the gasification apparatus is reduced to produce a second syngas with $CO/CO_2$ molar ratio greater than that of the first syngas. In this aspect, the second target temperature is about 100° C. to about 200° C. The process is effective for providing a syngas having less than about 10 ppm tars.

In another aspect, a process is provided for cooling syngas. The process includes passing a syngas through a syngas cooler to produce a cooled syngas; and recycling at least a portion of the cooled syngas to an inlet of the syngas cooler to maintain a temperature at the inlet of the syngas cooler of 760° C. or less and a linear velocity through the syngas cooler of at least 24 meters per second.

BRIEF DESCRIPTION OF FIGURES

The above and other aspects, features and advantages of several aspects of the process will be more apparent from the following drawings.

Figure 1:
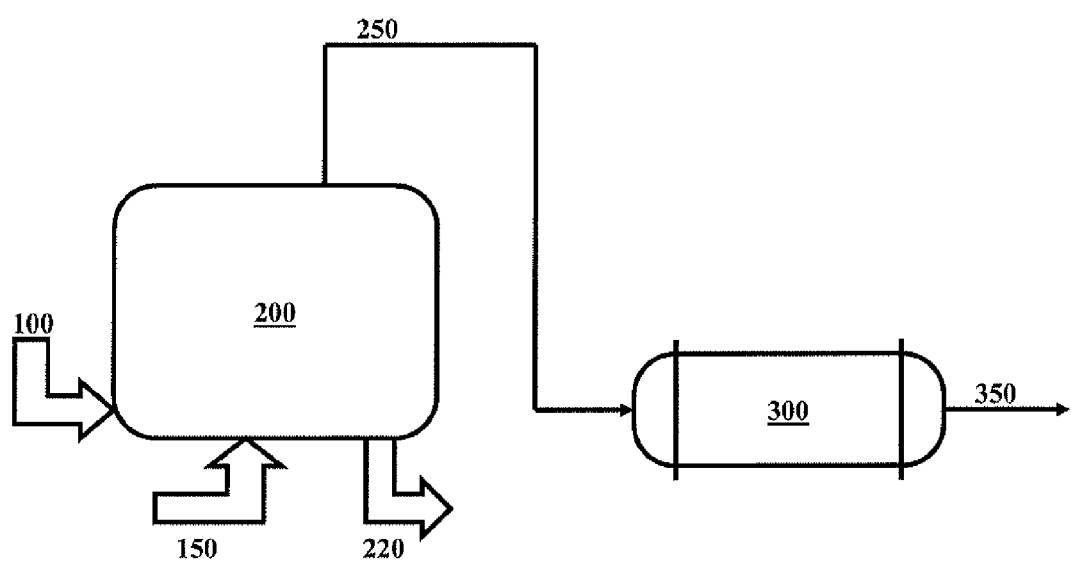
FIG. 1 is a schematic diagram of an aspect of a process that includes gasification of carbonaceous material by treating with molecular oxygen in a gasification apparatus to produce a hot syngas and subsequent cooling of said hot syngas in a syngas cooler to produce a cooled syngas.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects of the present process and apparatus. Also, common but well-understood elements that are useful or necessary in commercially feasible aspects are often not depicted in order to facilitate a less obstructed view of these various aspects.

DETAILED DESCRIPTION

Definitions

Unless otherwise defined, the following terms as used throughout this specification for the present disclosure are defined as follows and can include either the singular or plural forms of definitions below defined:

The term "about" modifying any amount refers to the variation in that amount encountered in real world conditions, e.g., in the lab, pilot plant, or production facility. For example, an amount of an ingredient or measurement employed in a mixture or quantity when modified by "about" includes the variation and degree of care typically employed in measuring in an experimental condition in production plant or lab. For example, the amount of a component of a product when modified by "about" includes the variation between batches in a multiple experiments in the plant or lab and the variation inherent in the analytical method. Whether or not modified by "about," the amounts include equivalents to those amounts. Any quantity stated herein and modified by "about" can also be employed in the present disclosure as the amount not modified by "about".

The term "bag-house" or "baghouse" means process or equipment designed for the use of engineered fabric filter tubes, envelopes or cartridges for capturing, separation or filtering of solid particles (fine particles, dust) contained in a gas. Dust-laden or solid-laden gases enter the bag-house and pass through fabric bags that act as filters. The bags can be of woven or felted cotton, synthetic, or glass-fiber material in either a tube or envelope shape. Common types of bag-houses include mechanical shaker, reverse air, and reverse jet.

"Carbonaceous material" as used herein refers to carbon rich material such as coal, and petrochemicals. However, in this specification, carbonaceous material includes any carbon material whether in solid, liquid, gas, or plasma state. Among the numerous items that can be considered carbonaceous material, the present disclosure contemplates: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

The term "dust collector" or "dust collection system" means process or equipment designed for capturing, separation or filtering of solid particles (fine particles, dust) contained in a gas. A dust collection system generally consists of a blower, dust filter, a filter-cleaning system, and a dust receptacle or dust removal system. Principal types of industrial dust collectors include inertial separators, fabric filters or baghouses, wet scrubbers, electrostatic precipitators, and unit collectors.

The term "fibersoft" or "Fibersoft" or "fibrosoft" or "fibrousoft" means a type of carbonaceous material that is produced as a result of softening and concentration of various substances; in an example carbonaceous material is produced via steam autoclaving of various substances. In another example, the fibersoft can include steam autoclaving of municipal, industrial, commercial, and medical waste resulting in a fibrous mushy material.

The term "municipal solid waste" or "MSW" or "msw" means waste that may include household, commercial, industrial and/or residual waste.

The term "syngas" or "synthesis gas" means synthesis gas which is the name given to a gas mixture that contains varying amounts of carbon monoxide and hydrogen. Examples of production methods include steam reforming of natural gas or hydrocarbons to produce hydrogen, the gasification of coal and in some types of waste-to-energy gasification facilities. The name comes from their use as intermediates in creating synthetic natural gas (SNG) and for producing ammonia or methanol. Syngas comprises use as an intermediate in producing synthetic petroleum for use as a fuel or lubricant via Fischer-Tropsch synthesis and previously the Mobil methanol to gasoline process. Syngas consists primarily of hydrogen, carbon monoxide, and some carbon dioxide, and has less than half the energy density (i.e., BTU content) of natural gas. Syngas is combustible and is often used as a fuel source or as an intermediate for the production of other chemicals.

"Ton" or "ton" refers to U.S. short ton, i.e. about 907.2 kg (2000 lbs).

As used herein, the term "tar" includes, without limitation, a gaseous tar, a liquid tar, a solid tar, a tar-forming substances, or mixtures thereof; which generally comprise hydrocarbons and derivatives thereof. A large number of well known tar measurement methods exist that may be utilized to measure tar. One large family of techniques includes analytical methods based on liquid or gas phase chromatography coupled with a detector. The most frequent detectors in the case of measurement of tars are the flame-ionization detector (FID) and the mass spectrometer. Another family of techniques includes spectrometric methods, which include detecting and analyzing a spectrum. This is for example infrared, ultraviolet (UV) or luminescence spectrometry, and LIBS (Laser-Induced Breakdown Spectroscopy) technique. Another technique for monitoring of combustion gases is FTIR (Fourier Transform InfraRed) infrared spectrometry. Miscellaneous documents mention this technique, such as for example WO2006015660, WO03060480 and U.S. Pat. No. 5,984,998.

There exist other known electronic methods which allow continuous monitoring of tars. These techniques include detectors with electrochemical cells and sensors with semiconductors. Various gravimetric techniques may also be utilized for tar measurements. In one aspect, the amount of tar may be expressed as equivalent ppm of carbon. In this aspect, the hydrocarbon may be benzene or an alcohol, such as methanol. In this aspect, a tar concentration equivalent or tar equivalents most preferably corresponds to as equivalent ppm (molar) of benzene. The tar concentration is usefully measured at the outlet of the gasification apparatus and upstream of any substantial cooling of the syngas.

Detailed Description

The following description is not to be taken in a limiting sense, but is made merely for the purpose of describing the general principles of exemplary embodiments. The scope of the invention should be determined with reference to the claims.

A gasification process for producing syngas is provided that includes gasifying carbonaceous material in a gasification apparatus to produce syngas that includes carbon monoxide (CO) and carbon dioxide ($CO_2$) and cooling said syngas in a syngas cooler or waste heat boiler and optionally further treating the cooled syngas with chemicals to remove contaminants and then further treating the chemical containing syngas in a dust collection system, e.g. a bag-house. The process includes operating the gasification apparatus in a start-up mode with a reduced rate of feed, optionally with a high oxygen input per unit mass of carbonaceous material (e.g., stoichiometric or near stoichiometric or above stoichiometric amount of oxygen) to produce a first syngas with low CO content i.e. with low $CO/CO_2$ ratio, e.g. $CO/CO_2$ molar ratio less than about 0.5. The process includes operating the gasification apparatus in a production mode, i.e. with a low oxygen input per unit mass of carbonaceous material (e.g., sub-stoichiometric amount of oxygen) in order to preferentially promote production of carbon monoxide and to produce a second syngas with high CO content i.e. with high $CO/CO_2$ ratio, e.g. $CO/CO_2$ molar ratio greater than that of first syngas. In one embodiment, $CO/CO_2$ molar ratio in the second syngas is greater than about 1.0.

The process includes operating the gasification apparatus in a start-up mode until the gasification apparatus and equipment downstream of the gasification apparatus are adequately warmed up. The process, therefore, includes measuring temperatures of at one or more points (locations) inside and downstream of the gasification apparatus. In one aspect, the process includes measuring temperatures of syngas (e.g. first syngas) at one or more points (locations) inside and downstream of the gasification apparatus. According to the process, operation of the gasification apparatus transitions from start-up mode to production mode after one or more points (locations) inside and downstream of the gasification apparatus attain target temperatures. In one aspect, operation of the gasification apparatus transitions from start-up mode to production mode after temperature of syngas (first syngas) prior to entering syngas cooler attains a first target temperature. In one aspect, operation of the gasification apparatus transitions from start-up mode to production mode after temperature of syngas (first syngas) at exit of dust-collection system (e.g. bag-house) attains a second target temperature.

Until the temperature of first syngas attains the first target temperature, all or part of the first syngas produced during this start-up mode of operation can be passed through the syngas cooler to produce a cooled first syngas. Alternatively, all or part of the first syngas produced during this start-up mode of operation can be sent to a thermal oxidation unit for processing and disposal. In one embodiment, all or a part of first syngas is sent to a thermal oxidation unit until temperature of first syngas at entry of said syngas cooler attains the first target temperature. In one aspect, all or a part of first syngas is sent to a thermal oxidation unit during operation of gasification apparatus in start-up mode.

In one aspect, operation of the gasification apparatus transitions to production mode after the temperature of first syngas at syngas cooler entry attains a first target temperature. In one aspect, operation of the gasification apparatus transitions to production mode after the temperature of first syngas at exit of dust collection system (e.g. bag-house) attains a second target temperature. Addition of carbonaceous material and molecular oxygen into the gasification apparatus is continued, however, addition of molecular oxygen per unit mass of carbonaceous material in said gasification apparatus is reduced in order to produce a second syngas with high CO content or with high $CO/CO_2$ ratio, e.g. $CO/CO_2$ molar ratio greater than that of first syngas. For example, in one embodiment, $CO/CO_2$ molar ratio in the second syngas is greater than about 1.0. All or part of the first syngas produced during this production mode of operation can be passed through the syngas cooler to produce a cooled second syngas. Optionally, all or part of the second syngas produced during this production mode of operation can be sent to a thermal oxidation unit for processing and disposal.

It is desirable to have little or no CO and mostly $CO_2$ in the first syngas. In one aspect, the process is effective for providing a $CO/CO_2$ molar ratio in said first syngas of less than about 0.5. In one aspect, the $CO/CO_2$ molar ratio in said first syngas is less than about 0.25. In another aspect, the $CO/CO_2$ molar ratio in said first syngas is less than about 0.1. It is desirable to have more CO and less $CO_2$ in the second syngas. In one aspect, the process is effective for providing a $CO/CO_2$ molar ratio in said second syngas of greater than about 1.0. In one aspect, the $CO/CO_2$ molar ratio in said second syngas is greater than about 1.5.

A sub-stoichiometric amount of oxygen is supplied to the gasification apparatus in order to promote production of carbon monoxide during operation in production mode. Therefore, in one aspect, during operation in production mode, the ratio of amount of molecular oxygen input to total amount of molecular oxygen required to completely oxidize all carbon contained in carbonaceous material feed to carbon dioxide is in a range of 0.1 to 0.9, in one aspect 0.1 to 0.8, in another aspect 0.1 to 0.7, and in another aspect 0.1 to 0.45. In one aspect, during operation in start-up mode, the ratio of amount of molecular oxygen input to total amount of molecular oxygen required to completely oxidize all carbon contained in carbonaceous material feed to carbon dioxide is in a range of 0.5 to 2.0. In one aspect, during operation in start-up mode, the ratio of amount of molecular oxygen input to total amount of molecular oxygen required to completely oxidize all carbon contained in carbonaceous material feed to carbon dioxide is in a range of 0.75 to 1.5. In one aspect, during operation in start-up mode, the ratio of amount of molecular oxygen input to total amount of molecular oxygen required to completely oxidize all carbon contained in carbonaceous material feed to carbon dioxide is in a range of 0.9 to 1.1.

The target temperatures are selected in a way that occurrence of fouling or deposit formation inside and downstream of the gasification apparatus can be avoided or reduced. The first target temperature can be about 700° C. to about 1000° C. In one aspect, the first target temperature can be about 750° C. to about 850° C. The second target temperature at an exit of the dust collection system can be about 100° C. to about 200° C. In one aspect, the second target temperature can be about 100° C. to about 150° C.

The reduction of the rate of addition of molecular oxygen per unit mass of carbonaceous material can be accomplished by increasing the rate of addition of carbonaceous material. For example in one aspect, for start-up mode of operation, the rate of addition of carbonaceous material feed is kept significantly lower than that for production mode of operation while keeping the rate of addition of molecular oxygen at the same level as in each mode of operation. The reduction of the rate of addition of molecular oxygen per unit mass of carbonaceous material can be accomplished by decreasing rate of addition of molecular oxygen. For example in one aspect, the rate of addition of carbonaceous material feed is kept the same for start-up mode of operation and the production mode of operation but the rate of addition of molecular oxygen is decreased. In one aspect, the rate of addition of molecular oxygen is decreased as the mode of operation is changed from start-up mode to production mode while rate of addition of carbonaceous material is increased.

Occurrence of fouling or deposit formation can be avoided or reduced in the syngas cooler by taking an additional measure of assuring a high enough linear velocity of gas flowing through the syngas cooler. A linear velocity measured at the inlet of the syngas cooler is greater than about 15 meters/second, in another aspect, greater than about 20 meters/second, and in another aspect, about 24 meters/second is desirable. In another aspect, the linear velocity measured at an inlet of the syngas cooler is between about 15 to about 30 meters/second, and in another aspect, about 22 to about 26 meters/second. Increased linear velocity can be accomplished by increasing the volumetric flow rate of gas and/or decreasing the cross sectional area of flow. The volumetric flow rate can be increased by recycling all or part of the gas exiting the syngas cooler back to the syngas cooler inlet. For example in one aspect, an increased linear velocity is attained by mixing at least a portion of the cooled first syngas with at least a portion of first syngas prior to passing through said syngas cooler. In another aspect, an increased linear velocity is attained by mixing at least a portion of cooled second syngas with at least a portion of second syngas prior to passing through said syngas cooler. Increased volumetric flow rate can also be obtained by increasing the inert content of the gas. The use of recycled cooled syngas enables optimum exchanger velocities to be maintained when the syngas production rate is reduced for whatever reason, including during start-up, shut-down and feedstock transitions. Thus in one aspect, an increased linear velocity is attained by using air as a molecular oxygen source especially during start-up mode of operation.

The gasification apparatus may include any gasification equipment described in prior art such as, but not limited to moving bed, fixed bed, fluidized bed, entrained flow, counter-current ("up draft"), co-current ("down draft"), counter-current fixed bed, co-current fixed bed, counter-current moving bed, co-current moving bed cross draft, hybrid, cross flow, cross flow moving bed, or a part thereof. In one aspect, the gasification apparatus comprises a cross flow unit. In one embodiment, the gasification apparatus comprises a cross flow moving bed unit.

In one aspect, the gasification apparatus includes a gasification zone wherein carbonaceous material is contacted with oxygen containing gas at a relatively low temperature (e.g. below the ash fusion temperature) to produce a raw syngas and a heat treatment zone wherein the raw syngas undergoes heat treatment or conditioning in the presence of an additional amount of oxygen at a higher temperature (e.g. above the ash fusion temperature) to produce a hot syngas. In one aspect, for example during start-up, pressure is atmospheric or greater than atmospheric. In another aspect, for example during start-up mode, air leakage may be allowed.

In one aspect, the gasification apparatus or the gasification zone includes multiple sections or gasification hearths for contacting said carbonaceous material with a first molecular oxygen-containing gas and optionally with one or more of steam and $CO_2$ to gasify a portion of said carbonaceous material and to produce a first gaseous product. In various aspects, the gasification apparatus or gasification zone comprises 1, 2, 3, 4, 5, 6, 7, 8, 9, or 10 sections or gasification hearths. Gas inlets for introduction of molecular oxygen can be attached to the gasification apparatus or gasification zone or one or more hearths contained therein. Steam or $CO_2$ may also be introduced through one or more of these gas inlets. In one aspect, one or more of molecular oxygen, steam and $CO_2$ are premixed prior to supplying to the gas inlets attached to the gasification apparatus or the gasification zone or to one or more hearths contained therein.

The heat treatment zone may accomplish one or more of cracking and partial oxidation of any tar contained in raw syngas. The heat treatment zone can be a horizontal or a vertical chamber with circular or square or rectangular or any other cross section. The heat treatment zone can be inclined to the horizontal or vertical direction. In one aspect, the heat treatment zone is connected to the gasification zone through one or more connecting zones. A gas inlet can be attached directly to the heat treatment zone. One or more gas inlets can be attached to one or more connecting zones (throats). Molecular oxygen containing gas can be introduced directly into the heat treatment zone. Molecular oxygen containing gas can be introduced into the heat treatment zone through one or more gas inlets attached to one or more connecting zones.

Undesirable hot spots might be created in said gasification-apparatus or in the gasification zone or hearths contained therein due to uneven distribution of molecular oxygen containing gas in said carbonaceous material feed. This may produce poor quality syngas. Formation of hot spots can be reduced or prevented by injecting one or more of steam and carbon dioxide into one or more of said gasification apparatus. Thus, in order to prevent undesirable hot spots, carbonaceous material feed may be treated with steam along with molecular oxygen in the gasification apparatus. Carbonaceous material feed may be treated with $CO_2$ gas along with molecular oxygen in the gasification apparatus. However, during operation in start-up mode wherein an objective can be rapid heating of the process, co-feeding steam or $CO_2$ may not be advantageous. Co-feeding steam or $CO_2$ may be advantageous and important during operation in production mode.

The source of molecular oxygen can be one or more of air, oxygen enriched air or pure oxygen. The total amount of molecular oxygen introduced in the gasification apparatus during operation in production mode can be about 0 to about 75 lb-moles per ton of carbonaceous material on a dry basis, in another aspect about 0 to about 50 lb-moles per ton of carbonaceous material on a dry basis, and in another aspect about 40 to about 60 lb-moles per ton of carbonaceous material on a dry basis. The total amount of molecular oxygen introduced in the gasification apparatus during operation in start-up mode can be in a range of about 0 to about 125 lb-moles per ton of carbonaceous material on a dry basis, in another aspect about 0 to about 100 lb-moles per ton of carbonaceous material on a dry basis, and in another aspect about 0 to about 50 lb-moles per ton of carbonaceous material on a dry basis. The total amount of steam introduced in the gasification apparatus can be about 0 to about 50 lb-moles per ton of carbonaceous material feed on a dry basis. The total amount of carbon dioxide gas introduced in the gasification apparatus can be about 0 to about 50 lb-moles per ton of carbonaceous material feed on a dry basis. In one aspect, both steam and carbon dioxide gas are introduced in the gasification apparatus.

The carbonaceous material fed to the gasifier may include carbonaceous material, carbonaceous liquid product, carbonaceous industrial liquid recycle, carbonaceous municipal solid waste (msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations. In one embodiment of the present disclosure the carbonaceous material fed to the gasifier comprises a plurality of carbonaceous materials selected from carbonaceous material, carbonaceous liquid product, carbonaceous industrial liquid recycle, carbonaceous municipal solid waste (msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

In one aspect, said carbonaceous material includes water. In one aspect, said carbonaceous material includes less than about 50 wt % water. In one aspect, said carbonaceous material includes less than about 25 wt % water. In one aspect, said carbonaceous material includes less than about 15 wt % water. In one aspect, the moisture content of said carbonaceous material is decreased by pre-drying. In one aspect, said carbonaceous material includes greater than about 25 wt % carbon on a dry or water free basis. In one aspect said carbonaceous material includes greater than about 50 wt % carbon on a dry or water free basis. In one aspect, said carbonaceous material includes about 0 to about 50 wt % oxygen on a dry or water free basis. In one aspect said carbonaceous material includes about 0 to about 25 wt % hydrogen on a dry or water free basis. In one aspect, said carbonaceous material includes less than about 25 wt % ash on a dry or water free basis. In one aspect said carbonaceous material includes less than about 15 wt % ash on a dry or water free basis.

As described above, syngas produced by the gasification apparatus can be cooled in a syngas cooler to produce a cooled syngas for downstream use, e.g. fermentation to produce chemicals such as acetic acid, ethanol, etc. The syngas cooler may be heat exchange equipment or a heat exchanger known in the art. For example a syngas cooler can be a selection from: shell-and-tube heat exchanger, plate heat exchanger, plate-and-frame heat exchanger, tubular heat exchanger, double-pipe heat exchanger, hair-pin heat exchanger, single-pass heat exchanger, multi-pass heat exchanger, plate-fin heat exchanger, spiral heat exchanger, and combinations thereof.

Cooled syngas may contain contaminants that should be removed prior to downstream use. Removal of contaminants can be accomplished by treating cooled syngas with chemical agents. Thus, one or more chemical agents may be added to cooled syngas to produce a chemical containing cooled syngas. The chemical containing cooled syngas may be processed in a dust collection system (e.g. a bag-house) to remove chemical residues to thus produce a clean cooled syngas. Clean cooled syngas may be sent to a down stream processing or to a thermal oxidation unit. The clean cooled syngas can be optionally further cooled in a quench tower prior to downstream use.

The dust collection system is effective for capturing, separation or filtering of solid particles (fine particles, dust) from the gas. The dust collection system may include one or more of a blower, a dust filter, a filter-cleaning system, and a dust receptacle or dust removal system. The dust collection system can be an inertial separator type dust collector, a fabric filter type dust collector (bag-house), a wet scrubber, an electrostatic precipitator, or a unit collector. In one aspect, the dust collection system is a bag-house.

For a gasification apparatus that includes a gasification zone and a heat treatment zone, the heat treatment zone may be cold during start-up and may be prone to fouling or deposit formation or may contribute to fouling or deposit formation in the downstream piping or syngas cooler. It is, therefore, often preferred that the gasification apparatus is operated in start-up mode until the heat treatment zone is adequately warmed up. For example in one aspect, the gasification apparatus is operated in start-up mode until the heat treatment zone attains a temperature of about 900° C. Operation in production mode is not started until the heat treatment zone attains at least about 900° C. temperature. Optionally, all or part of the first syngas produced is sent to a thermal oxidation unit until the heat treatment zone attains at least about 900° C. temperature. In one embodiment, the gasification apparatus is operated in a start-up mode until the heat treatment zone attains a temperature of about 1000° C. Operation in production mode is not started until the heat treatment zone attains at least about 1000° C. Optionally, all or part of the first syngas produced is sent to a thermal oxidation unit until the heat treatment zone attains at least about 1000° C.

In one aspect, at least a portion of syngas exiting the syngas cooler is recycled back to the gasification apparatus in order to cool the syngas cooler inlet temperature and/or increase the linear velocity of gas entering syngas cooler. In one aspect, at least a portion of syngas exiting the syngas cooler is recycled back to the connecting zone of a gasification apparatus in order to increase the linear velocity of gas entering syngas cooler as well as through the connecting zone wherein the gasification zone includes a gasification zone and a heat treatment zone connected by a connecting zone.

FIGS. 1 to 4 illustrates various aspects of the process. FIG. 1 is a schematic diagram of one aspect of a process comprising gasification of carbonaceous material by treating with molecular oxygen in a gasification apparatus to produce a hot syngas and subsequent cooling of said hot syngas in a syngas cooler to produce a cooled syngas. Referring now to FIG. 1, a carbonaceous material feed (100) is introduced in the gasification-apparatus (200). A molecular oxygen containing gas (150) is supplied to the gasification apparatus and thus the carbonaceous material feed is treated with molecular oxygen in order to initiate and facilitate chemical transformation of carbonaceous material. At least a portion of the carbonaceous material feed is gasified in the gasification apparatus to produce a gaseous product or syngas (250). Supply of oxygen into the gasification-apparatus can be controlled in order to control relative amounts of carbon monoxide (CO) and carbon dioxide ($CO_2$) produced from gasification of the carbonaceous material. Hot syngas is subsequently cooled in a syngas cooler (300) to produce a cooled syngas (350). A stream of ash (220) is removed from the gasification apparatus.

Figure 2:
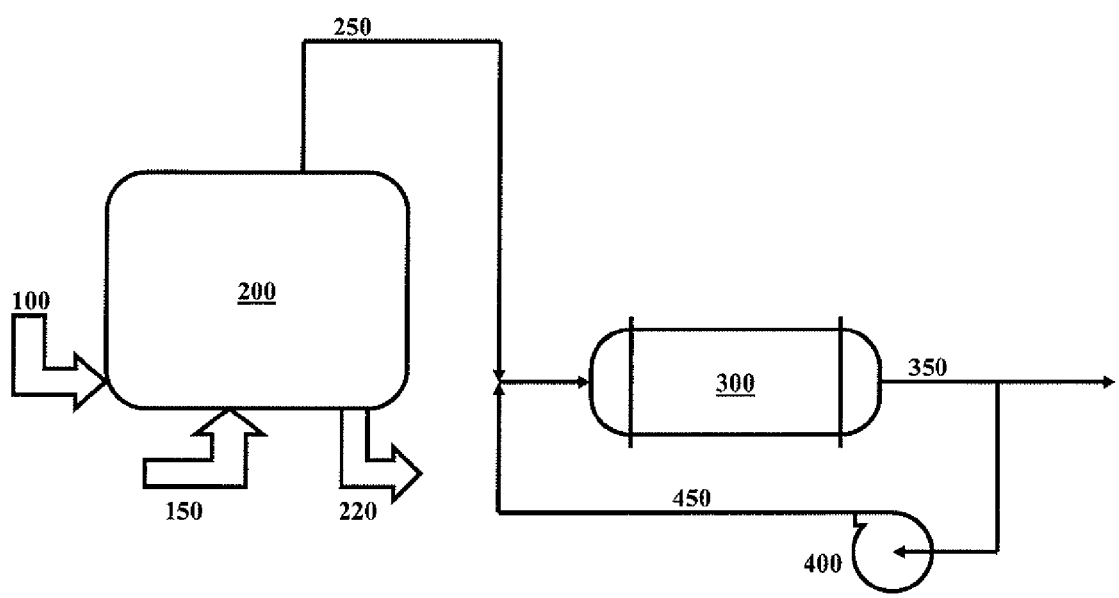
FIG. 2 is a schematic diagram of an aspect of a process that includes gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler.

FIG. 2 is a schematic diagram of an aspect of a process including gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler. Referring now to FIG. 2, a carbonaceous material feed (100) is introduced in the gasification-apparatus (200). A molecular oxygen containing gas (150) is supplied to the gasification apparatus and thus the carbonaceous material feed is treated with molecular oxygen in order to initiate and facilitate chemical transformation of carbonaceous material. At least a portion of the carbonaceous material feed is gasified in the gasification apparatus to produce a gaseous product or syngas (250). Supply of oxygen into the gasification-apparatus can be controlled in order to control relative amounts of carbon monoxide (CO) and carbon dioxide ($CO_2$) produced from gasification of the carbonaceous material. Hot syngas is subsequently cooled in a syngas cooler (300) to produce a cooled syngas (350). At least a part of said cooled syngas (450) is recycled and mixed with said hot syngas prior to entry into syngas cooler. A compressor (400) is used to facilitate recycle of cooled syngas. A stream of ash (220) is removed from the gasification apparatus.

Figure 3:
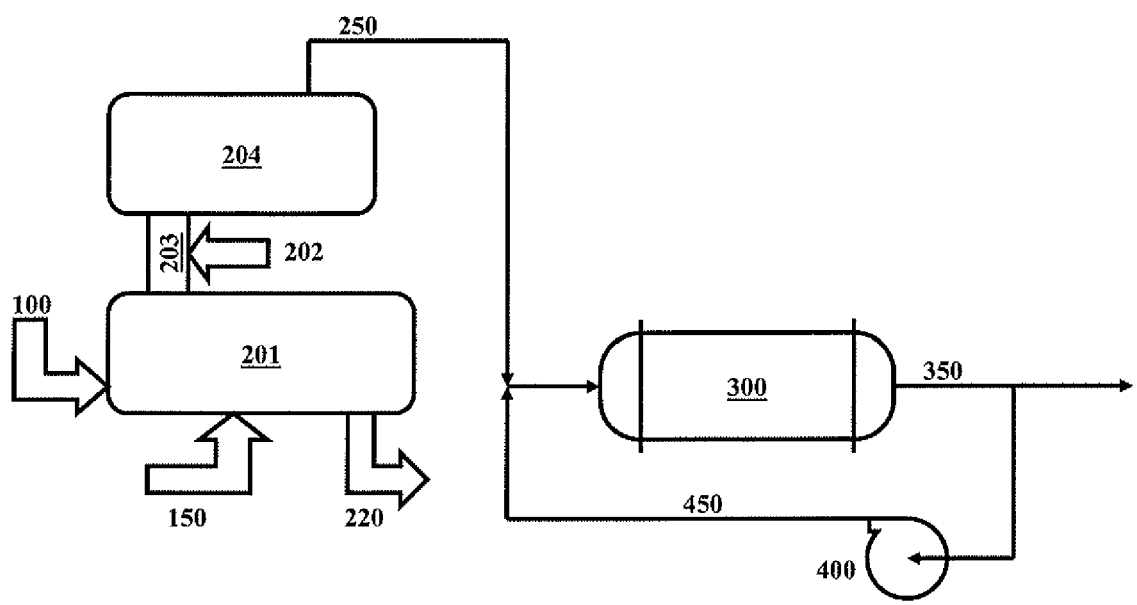
FIG. 3 is a schematic diagram of an aspect of a process that includes gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler; and wherein the gasification apparatus includes two reaction zones, e.g., a gasification zone and a heat treatment zone connected through a connecting zone.

FIG. 3 is a schematic diagram of an aspect of a process that includes gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler; and wherein the gasification apparatus comprises two reaction zones, e.g., a gasification zone and a heat treatment zone connected through a connecting zone. Referring now to FIG. 3, a carbonaceous material feed (100) is introduced in the gasification zone (201) of said gasification-apparatus. A molecular oxygen containing gas (150) is supplied to the gasification zone of said gasification apparatus and thus the carbonaceous material feed is treated with molecular oxygen in order to initiate and facilitate chemical transformation of carbonaceous material. At least a portion of the carbonaceous material feed is gasified in the gasification zone to produce a raw gaseous product (raw syngas). The raw syngas passes through the connecting zone (203). Molecular oxygen (202) is introduced in the connecting zone to be mixed with said raw syngas. Mixture comprising raw syngas and molecular oxygen enters the heat treatment zone (204). Molecular oxygen can also be introduced in the heat treatment zone. Raw syngas undergoes heat treatment in the heat treatment zone to produce a hot syngas (250). Supply of oxygen into the gasification-apparatus (one or more of gasification zone, connecting zone and heat treatment zone) can be controlled in order to control relative amounts of carbon monoxide (CO) and carbon dioxide ($CO_2$) produced from gasification of the carbonaceous material. Hot syngas is subsequently cooled in a syngas cooler (300) to produce a cooled syngas (350). At least a part of said cooled syngas (450) is recycled and mixed with said hot syngas prior to entry into syngas cooler. A compressor (400) is used to facilitate recycle of cooled syngas. A stream of ash (220) is removed from the gasification apparatus.

Figure 4:
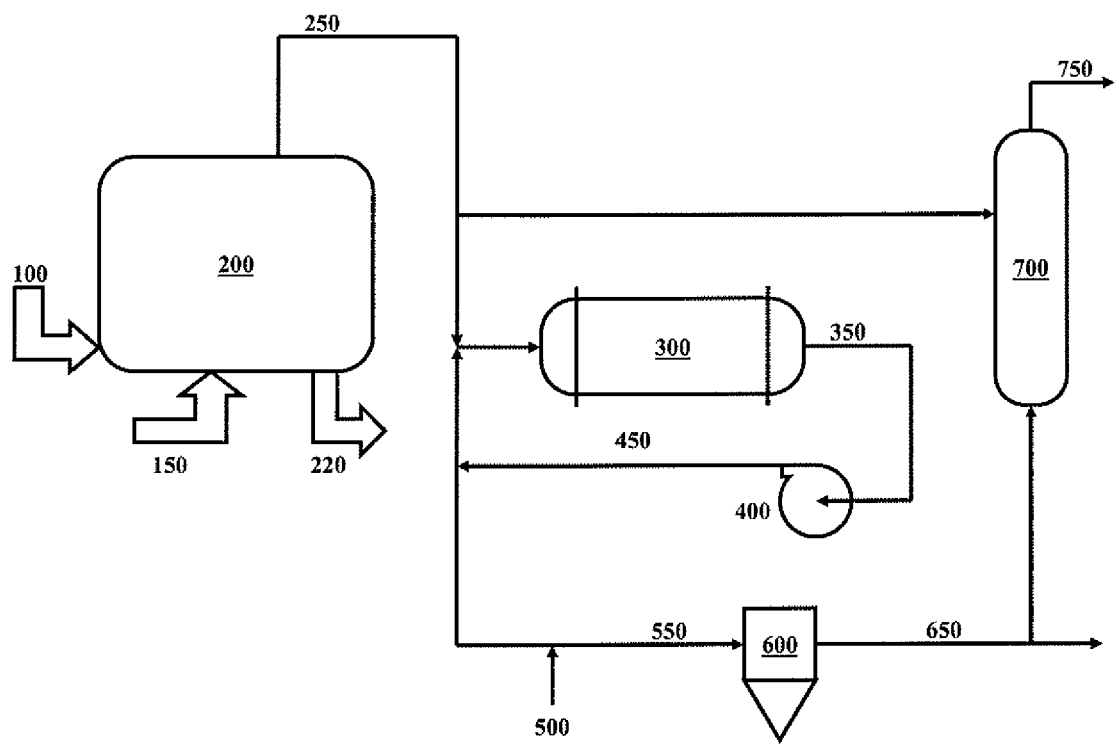
FIG. 4 is a schematic diagram of an aspect of a process that includes gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler; wherein at least a portion of one or more of hot and cooled syngas can be sent to a thermal oxidation unit; and wherein at least a portion of said cooled syngas can be processed in a bag-house.

FIG. 4 is a schematic diagram of a process that includes gasification of carbonaceous material by treating with molecular oxygen in a gasification apparatus to produce a hot syngas and subsequent cooling of said hot syngas in a syngas cooler to produce a cooled syngas; wherein at least a part of said cooled syngas is recycled and mixed with said hot syngas prior to entry into syngas cooler; wherein at least a portion of one or more of hot and cooled syngas can be sent to a thermal oxidation unit; and wherein at least a portion of said cooled syngas can be processed in a bag-house. Referring now to FIG. 4, a carbonaceous material feed (100) is introduced in the gasification-apparatus (200). A molecular oxygen containing gas (150) is supplied to the gasification apparatus and thus the carbonaceous material feed is treated with molecular oxygen in order to initiate and facilitate chemical transformation of carbonaceous material. At least a portion of the carbonaceous material feed is gasified in the gasification apparatus to produce a gaseous product or syngas (250). Supply of oxygen into the gasification-apparatus can be controlled in order to control relative amounts of carbon monoxide (CO) and carbon dioxide ($CO_2$) produced from gasification of the carbonaceous material. Hot syngas is subsequently cooled in a syngas cooler (300) to produce a cooled syngas (350). At least a part of said cooled syngas (450) is recycled and mixed with said hot syngas prior to entry into syngas cooler. A compressor (400) is used to facilitate recycle of cooled syngas. At least a portion of hot syngas can be sent to a thermal oxidation unit (700) for processing and disposal (750). At least portion of cooled syngas can be sent to a thermal oxidation unit. Cooled syngas may contain contaminants that should be removed prior to downstream use. Removal of contaminants can be accomplished by adding chemical agents. Thus one or more chemical agents (500) can be added to cooled syngas to produce a chemical containing cooled syngas (550). The chemical containing cooled syngas is processed in a bag-house (600) to remove chemical residues (chemical agents with contaminants) and to produce a clean cooled syngas (650) that is either sent to down stream processing or to thermal oxidation unit. The clean cooled syngas can be optionally further cooled in a quench tower prior to downstream use (not shown on diagram). A stream of ash (220) is removed from the gasification apparatus.

EXAMPLES

Example 1

Solid Load of Syngas Produced by Gasification in Production Mode

The gasification apparatus was operated in a start-up mode by providing carbonaceous materials to the gasifier at a feed rate of about half as much as that used in a production mode. Oxygen was supplied to the gasifier at a feed rate of about 40 to 50 lb-mole ton of carbonaceous material on a dry basis. As described previously, some air leakage into the gasifier was allowed that increase oxygen availability.

Upon starting up a gasifier under start-up mode as described above to obtain a first target temperature in a range of about 700° C. to about 1000° C., a carbonaceous material feed rate was increased into the gasification apparatus. A molecular oxygen containing gas was supplied to the gasification apparatus at the rate of about 50 to about 90 lb-moles per ton of water-free carbonaceous material. The gasifier was also fed a stream of carbon dioxide at the rate of about 10 to about 15 lb-moles per ton of water-free carbonaceous material.

Hot syngas is produced during this operation is subsequently cooled in a syngas cooler to produce a cooled syngas. Cooled syngas is processed in a bag-house to remove solid residues and to produce a clean cooled syngas. The clean cooled syngas comprised CO in the range of about 25 to about 35 mole %, $CO_2$ in the range of about 30 to about 40 mole %, $H_2$ in the range of about 10 to about 20 mole %, $N_2$ in the range of about 15 to about 25 mole % and small amount of $CH_4$. The bag-house removed about 1.5 to about 3.5 lbs solid per hour per 1000 lbs per hour clean cooled syngas produced.

Analysis of Residue from Bag-house

Start-up Mode: Low level of solid residue in syngas; operation in production mode can follow.

Production Mode Operable level of solid residue in syngas (3 fold increase of solids over start-up mode)

While the invention herein disclosed has been described by means of specific embodiments, examples and applications thereof, numerous modifications and variations could be made thereto by those skilled in the art without departing from the scope of the invention set forth in the claims.

What is claimed is:

1. A process for producing syngas, the process comprising:
   gasifying carbonaceous material to provide a first syngas having a CO to $CO_2$ molar ratio of less than about 0.5 until the first syngas reaches a first target temperature, wherein at least a portion of the first syngas is passed to a syngas cooler at a linear velocity of greater than about 24 meters per second and/or at least a portion of the first syngas is passed to a thermal oxidation unit;
   upon reaching the first target temperature, gasifying carbonaceous material to provide a second syngas having a CO to $CO_2$ ratio of greater than the first syngas; and
   passing at least a portion of the second syngas to a syngas cooler at a linear velocity of greater than about 24 meters per second.

2. The process of claim 1 wherein the gasifying of carbonaceous material occurs in a gasification apparatus.

3. The process of claim 1 wherein molecular oxygen is introduced at a rate of about 0 to about 100 lb-mole per ton of carbonaceous material on a dry basis to provide the first syngas.

4. The process of claim 2 wherein the temperature of the first syngas is measured at one or more points inside and/or downstream of the gasification apparatus.

5. The process of claim 4 wherein when the temperature of the first syngas at one or more points inside and/or outside the gasification apparatus reaches the first target temperature, molecular oxygen is introduced at a rate of about 0 to about 100 lb-mole per ton of carbonaceous material on a dry basis to provide the second syngas.

6. The process of claim 1 wherein the first target temperature is about 700° C. to about 1000° C.

7. The process of claim 1 wherein at least a portion of the first syngas is passed through a syngas cooler to produce a cooled first syngas and wherein at least a portion of the second syngas is passed through a syngas cooler to produce a cooled second syngas.

8. The process of claim 1 wherein at least a portion of the first syngas is provided to a thermal oxidation unit until the first syngas reaches the first target temperature.

9. A process to produce syngas, said process comprising:
   (a) adding carbonaceous material and molecular oxygen to a gasification apparatus to produce a first syngas with $CO/CO_2$ molar ratio less than 0.5;
   (b) passing at least a portion of the first syngas to a syngas cooler and/or passing at least a portion of the first syngas to a thermal oxidation unit;
   (c) measuring temperature of said first syngas downstream of said gasification apparatus; and
   (d) upon said temperature of said first syngas prior to entry in said syngas cooler attaining a first target temperature, reducing the addition of molecular oxygen per unit mass of carbonaceous material in said gasification apparatus to produce a second syngas with $CO/CO_2$ molar ratio greater than that of said first syngas,
   wherein a flow of syngas through the syngas cooler is maintained at a linear velocity of greater than about 24 meters per second.

10. The process of claim 9 wherein the temperature of said first syngas is measured prior to entry into a syngas cooler.

11. The process of claim 9 wherein the temperature of said first syngas is measured downstream of a syngas cooler.

12. The process of claim 9 wherein at least a portion of said first syngas is passed through said syngas cooler to produce a cooled first syngas and at least a portion of said second syngas is passed through said syngas cooler to produce a cooled second syngas.

13. The process of claim 9 wherein a source of molecular oxygen in step (a) is selected from the group consisting of air, oxygen enriched air, pure oxygen, and combinations thereof.

14. The process of claim 9 wherein a source of molecular oxygen in step (c) is selected from the group consisting of air, oxygen enriched air, pure oxygen, and combinations thereof.

15. The process of claim 9 wherein the source of molecular oxygen in step (a) comprises air.

16. The process of claim 9 wherein the source of molecular oxygen in step (c) comprises pure oxygen.

17. The process of claim 9 wherein said first target temperature is about 700° C. to about 1000° C.

18. The process of claim 9 wherein said first target temperature is about 750° C. to about 850° C.

19. The process of claim 9 wherein reduction of addition of molecular oxygen per unit mass of carbonaceous material is accomplished by increasing rate of addition of carbonaceous material.

20. The process of claim 9 wherein reduction of addition of molecular oxygen per unit mass of carbonaceous material is accomplished by decreasing rate of addition of molecular oxygen.

21. The process of claim 12 further comprising mixing at least a portion of said cooled first syngas with said portion of first syngas prior to passing through said syngas cooler to produce said cooled first syngas.

22. The process of claim 12 further comprising mixing at least a portion of said cooled second syngas with at least a portion of said second syngas prior to passing through said syngas cooler.

23. The process of claim 21 wherein linear velocity of mixture of said cooled first syngas and said first syngas flowing through said syngas cooler is greater than about 24 meter/second.

24. The process of claim 22 wherein linear velocity of mixture of said cooled second syngas and said second syngas flowing through said syngas cooler is greater than about 24 meter/second.

25. The process of claim 9 wherein the $CO/CO_2$ molar ratio of said second syngas is greater than about 1.0.

26. The process of claim 9 wherein the $CO/CO_2$ molar ratio of said second syngas is greater than about 1.5.

27. The process of claim 9 wherein said gasification apparatus is selected from the group consisting of moving bed, fixed bed, fluidized bed, entrained flow, counter-current ("up draft"), co-current ("down draft"), counter-current fixed bed, co-current fixed bed, counter-current moving bed, co-current moving bed cross draft, hybrid, cross flow, cross flow moving bed, part thereof, and combinations thereof.

28. The process of claim 9 wherein said gasification apparatus comprises one or more reaction zones.

29. The process of claim 9 wherein said gasification apparatus comprises a gasification zone for gasification of carbonaceous material to produce a raw syngas and a heat treatment zone for thermal treatment of said raw syngas to produce first syngas or second syngas.

30. The process of claim 29 further comprising: attaining at least about 900° C. temperature in said heat treatment zone prior to step (c).

31. The process of claim 29 further comprising: attaining at least about 1000° C. temperature in said heat treatment zone prior to step (c).

32. The process of claim 9 further comprising treating at least a portion of one or more of said first syngas, second syngas, cooled first syngas, and cooled second syngas in a thermal oxidation unit.

33. The process of claim 9 further comprising treating at least a portion of said first syngas in a thermal oxidation unit until said temperature of first syngas downstream of said gasification apparatus attains a first target temperature.

34. The process of claim 29 further comprising treating at least a portion of said first syngas in a thermal oxidation unit until attaining at least about 900° C. temperature in said heat treatment zone.

35. The process of claim 9 wherein said syngas cooler is selected from the group consisting of shell-and-tube heat exchanger, plate heat exchanger, plate-and-frame heat exchanger, tubular heat exchanger, double-pipe heat exchanger, hair-pin heat exchanger, single-pass heat exchanger, multi-pass heat exchanger, plate-fin heat exchanger, spiral heat exchanger, and combinations thereof.

36. The process of claim 9 further comprising adding one or more of steam and $CO_2$ in step (c).

37. The process of claim 9 wherein less than about 50 lb-mole steam per ton of carbonaceous material on a dry basis or less than about 50 lb-mole $CO_2$ per ton of carbonaceous material on a dry basis is added in step (a).

38. A process comprising gasifying carbonaceous material in a gasification apparatus to produce a syngas, said method comprising:
   (a) adding carbonaceous material and adding molecular oxygen in said gasification apparatus to produce a first syngas with $CO/CO_2$ molar ratio less than 0.5;
   (b) passing at least a portion of said first syngas through a syngas cooler at a linear velocity of greater than about 24 meters per second to produce a cooled first syngas;

(c) passing at least a portion of said cooled first syngas through a dust collection system to produce a cleaned syngas;
(d) measuring a temperature of said cleaned syngas at an exit of the dust collection system; and
(e) upon said temperature of cleaned syngas attaining a second target temperature, reducing addition of molecular oxygen per unit mass of carbonaceous material in said gasification apparatus to produce a second syngas with $CO/CO_2$ molar ratio greater than that of said first syngas.

39. The process of claim 38 wherein said second target temperature is about 100° C. to about 200° C.

40. The process of claim 38 wherein said second target temperature is about 100° C. to about 150° C.

41. The process of claim 38 wherein the syngas contains less than 10 ppm tars.

* * * * *